United States Patent [19]
Romano et al.

[11] Patent Number: 5,963,607
[45] Date of Patent: Oct. 5, 1999

[54] DIRECT DIGITAL SYNTHESIZER WITH HIGH RESOLUTION TRACKER

[75] Inventors: Glenn M. Romano, Greensboro, N.C.; Craig R. Consiglio, Manorville; Edward G. Tracey, East Northport, both of N.Y.

[73] Assignee: AIL Systems, Inc., Deer Park, N.Y.

[21] Appl. No.: 08/850,343

[22] Filed: May 2, 1997

[51] Int. Cl.[6] .......................................... H03D 3/24

[52] U.S. Cl. .................... 375/373; 375/375; 364/718.02; 327/106

[58] Field of Search ...................................... 327/105, 106, 327/107, 113, 114, 117; 455/260, 76; 364/721, 718.02; 375/373, 375, 376

[56] References Cited

U.S. PATENT DOCUMENTS

| | | | |
|---|---|---|---|
| 5,654,657 | 8/1997 | Pearce | 327/163 |
| 5,710,517 | 1/1998 | Meyer | 327/163 |
| 5,757,239 | 5/1998 | Gilmore | 331/18 |

*Primary Examiner*—Don N. Vo
*Attorney, Agent, or Firm*—Hoffmann & Baron, LLP

[57] ABSTRACT

A chirp direct digital synthesizer is formed with a phase and frequency tracker circuit to provide both enhanced resolution and reduced power consumption. The phase and frequency tracker circuit operates at a sub-synchronous clock rate and provides periodic phase and frequency correction data to the direct digital synthesizer. The phase and frequency tracker circuit is suitable for both continuous wave and chirp direct digital synthesizer operation.

10 Claims, 10 Drawing Sheets

CLOCK

Fig. 1B
(PRIOR ART)

PHASE ACCUMULATOR OUTPUT

Fig. 4A PHASE CLOCK

Fig. 4B TRACKER CLOCK A = 4

Fig. 4C

Fig. 4D PHASE TRACKER ACCUMULATOR OUTPUT WITH A = 4

DIRECT DIGITAL SYNTHESIZER WITH HIGH RESOLUTION TRACKER

BACKGROUND OF THE INVENTION

1. Field of the Invention

The present invention relates to direct digital synthesizers, and more particularly relates to a direct digital synthesizer with a tracker circuit operating at high resolution and low power consumption which is able to accommodate both single frequency and chirped frequency operation.

2. Description of the Prior Art

Figure 1:
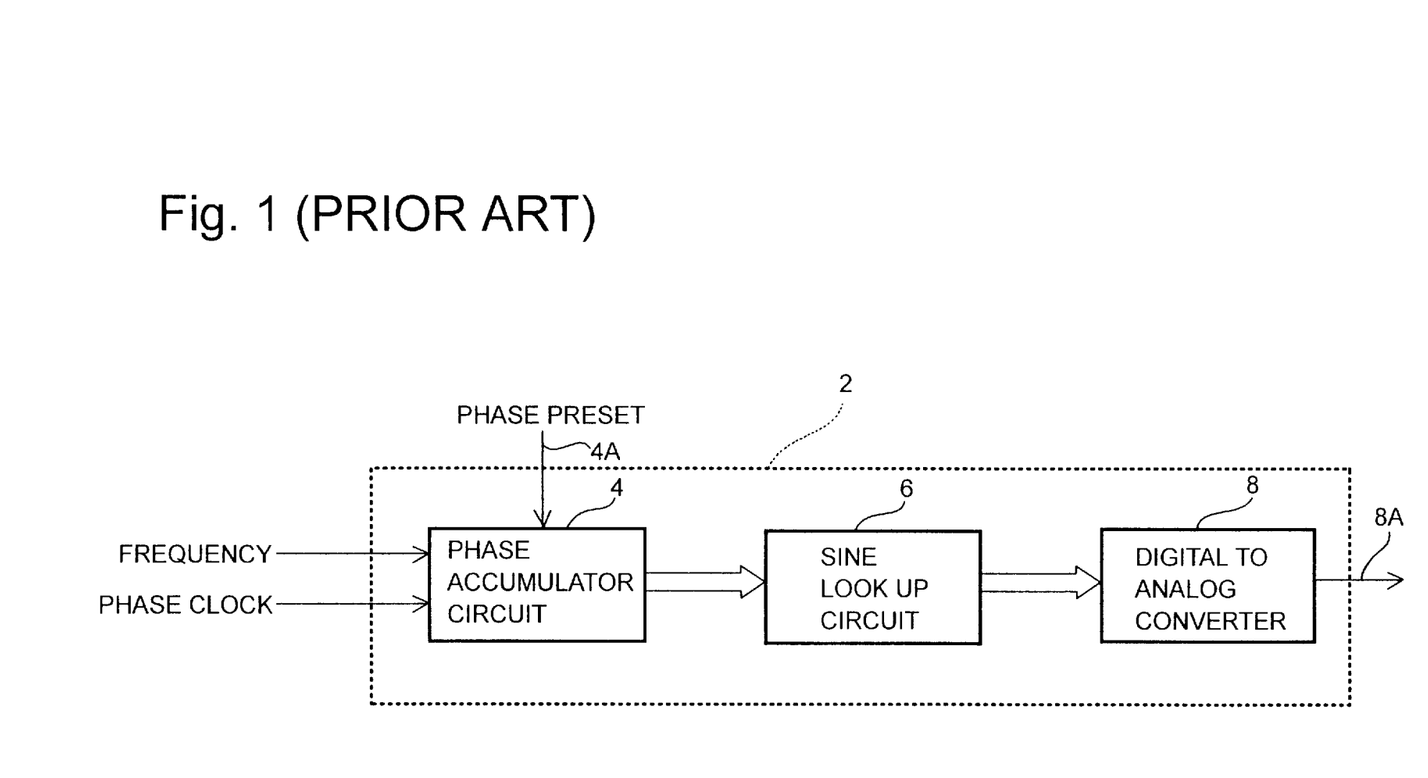
FIG. 1 is a block diagram of a continuous wave direct digital synthesizer known in the prior art.

Direct digital synthesizers (DDS) are well known in the prior art. FIG. 1 illustrates a conventional continuous wave (CW) direct digital synthesizer which numerically generates a sine wave output signal corresponding to a received numerical frequency value and phase clock signal. The DDS 2 consists primarily of three operating blocks; a phase accumulator circuit 4, a sine lookup circuit 6, and a digital to analog converter (DAC) 8. The phase accumulator circuit 4 includes a digital counter which receives the numerical frequency value signal and phase clock signal from an external controller. The phase accumulator circuit 4 increments the counter for each received clock signal by the value determined by the received frequency value signal.

The phase accumulator circuit 4 places the counter value on an output bus which is operatively coupled to the sine lookup circuit 6. The sine lookup circuit 6 is typically a read only memory (ROM) circuit which has a series of addressable locations. Each ROM location contains a value representing a phase value of the sine wave output signal. To generate the sine wave output signal, points along the full sine wave curve from 0 to $2\pi$ must be generated. However, as the sine wave signal is symmetrical, this signal can be generated by storing values in the sine lookup circuit from 0 to $\pi/2$ (¼ sine wave ROM). By incrementing, decrementing and inverting the values stored in the ¼ sine wave ROM via the phase accumulator circuit 4, the full sine wave signal is generated using a sine lookup circuit 6 with a required capacity which is reduced by a factor of 4. The phase values from the sine lookup circuit 6 are operatively coupled to the DAC 8 which converts the digital phase values from the sine lookup circuit 6 to an analog sine wave output signal. The analog sine wave output signal is presented on an output terminal 8A of the DAC.

The phase accumulator circuit 4 may further include a phase preset input terminal 4A. When a value is received by the phase preset input terminal 4A, the phase accumulator circuit 4 presents a value to the sine lookup circuit 6 which corresponds to the received phase preset value. This feature is useful in phase modulation applications where a predetermined starting phase is important.

The frequency of the sine wave output signal generated by the DDS 2 is related to the frequency of the phase clock signal and the phase increment (resolution) determined by the received frequency value signal. The output frequency is equal to:

$$F_{out} = \frac{F_{clock} \cdot \Delta\phi}{2^N}$$

where N is the number of bits in the phase accumulator counter circuit and $\Delta\phi$ is the phase increment applied to the phase accumulator.

Figure 1A:
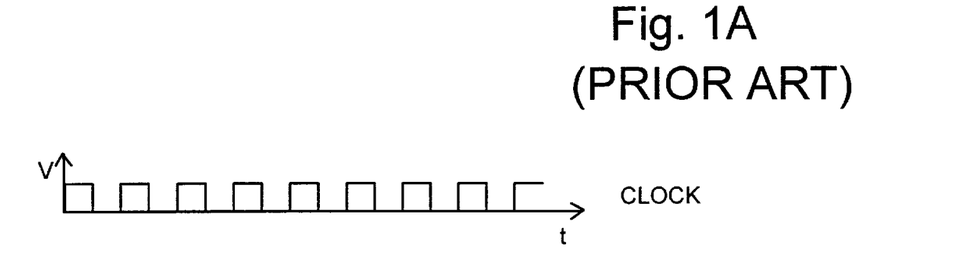
FIGS. 1A and 1B are timing diagrams of a direct digital synthesizer known in the prior art.
Figure 1B:
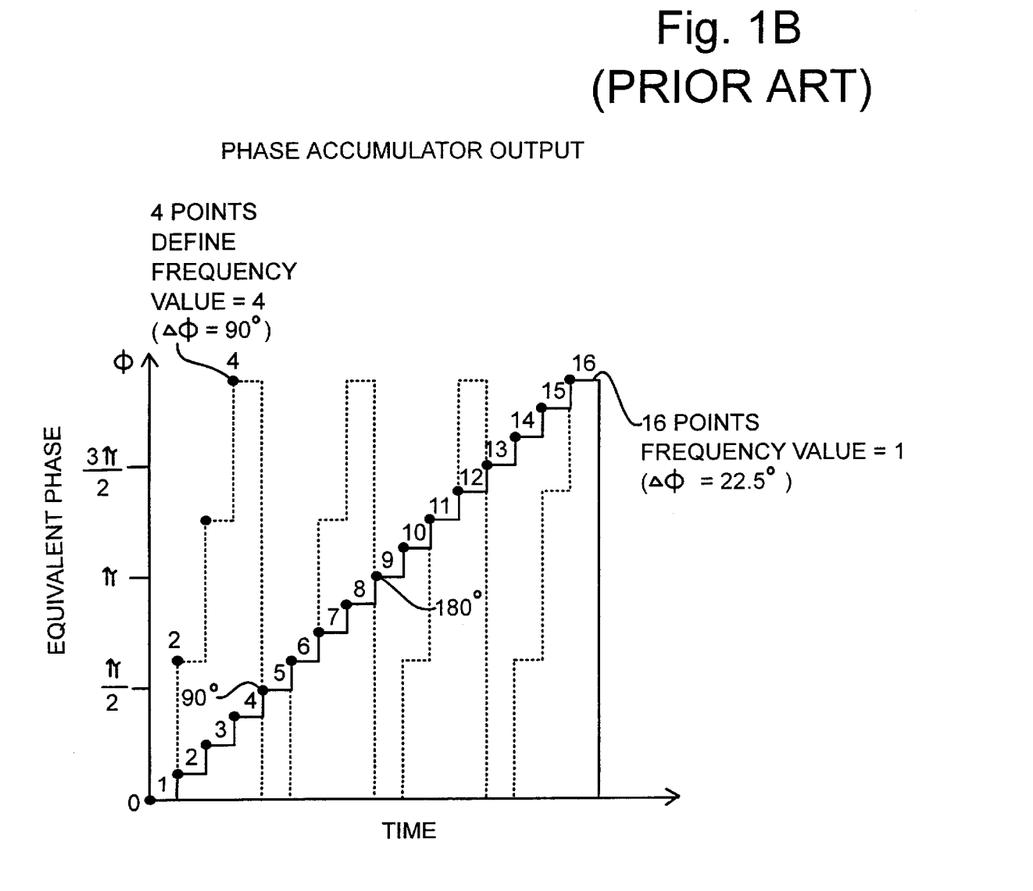

The frequency resolution of the DDS 2 is determined by N, the number of bits in the phase accumulator counter circuit. At a predetermined minimum output frequency for a given received clock signal, the phase accumulator 4 will generate a signal with $2^N$ different values. To generate higher frequency output signals, the phase accumulator circuit 4 eliminates a number of these output states at regular intervals from the counter output signal. This increases the phase step, $\Delta\phi$, for each output of the phase accumulator counter circuit. Since a smaller number of points are used to define the sine wave and the clock rate is constant, the frequency of the output signal generated by the DDS 2 is increased. This is illustrated in the timing diagrams shown in FIGS. 1A and 1B.

Figure 2:
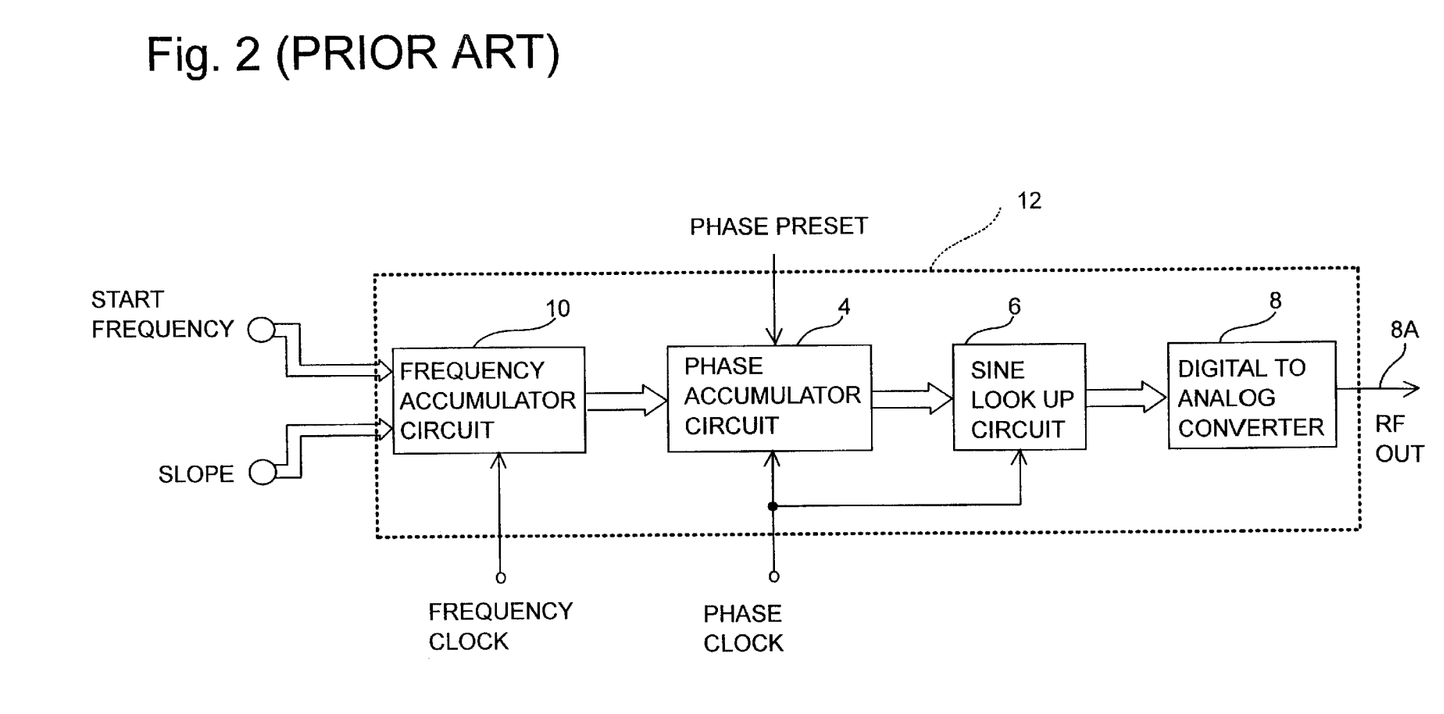
FIG. 2 is a block diagram of a frequency chirp direct digital synthesizer known in the prior art.

It is also possible to generate a linear variable frequency output or chirp signal from a DDS. FIG. 2 illustrates the conventional topology for a chirp DDS 12. In order to perform the additional function of frequency chirping, a frequency accumulator 10 is added to the DDS of FIG. 1. The frequency accumulator 10 receives a start frequency value and a slope value from an external controller. The start frequency value sets the initial operating frequency of the chirp DDS 12 and the slope value determines the rate of change in frequency of the chirp DDS output signal. The frequency accumulator 10 generates a digital signal which is operatively coupled to a frequency value input terminal of the phase accumulator 4. This digital signal has a value which increases at a rate determined by the slope value. By driving the phase accumulator 4 with a variable frequency value, the values presented to the sine lookup circuit 6 will represent the desired variable output frequency.

In the DDS of FIGS. 1 or 2, it is desirable to achieve high output frequencies as well as high frequency resolution. The frequency resolution of the DDS is limited by the number of bits used in the accumulators (both phase and frequency). Further, the output frequency of the DDS is limited by the frequency of the received phase clock signal to the phase accumulator 4. Therefore, in order to generate a high frequency output signal from a DDS which also features fine resolution, high speed digital circuitry must be employed in the phase and frequency accumulator circuits. Typically, 32 bit architecture is employed within the accumulator circuits in order to achieve the desired frequency resolution. When circuitry of this complexity is operated at the required clock speeds to generate high frequency output signals, the DDS will consume a large amount of power. Typically, these high speed 32-bit circuits are also expensive and generate a significant amount of undesired heat, the removal of which results in further cost and system complexity.

OBJECTS AND SUMMARY OF THE INVENTION

It is an object of the present invention to provide a direct digital synthesizer with a high resolution digital phase tracking circuit to enhance the resolution of the synthesizer.

It is another object of the present invention to provide a direct digital synthesizer with digital phase and frequency tracking to improve the resolution of a chirp direct digital frequency synthesizer.

It is yet another object of the present invention to provide a direct digital synthesizer with enhanced resolution which consumes less operating power than those synthesizers in the prior art.

It is still another object of the present invention to reduce the cost of a direct digital synthesizer without reducing the operating performance.

It is yet another object of the present invention to provide a tracker circuit which can maintain the phase coherence of a direct digital synthesizer switching between multiple operating frequencies.

It is yet another object of the present invention to provide a tracker circuit which can maintain the phase coherence of a chirp direct digital synthesizer switching between multiple operating frequencies.

In accordance with one form of the present invention, a direct digital synthesizer is formed having a low resolution phase accumulator circuit and a high resolution phase tracker circuit. The high resolution phase tracker circuit operates at a sub-synchronous clock speed to that of the phase accumulator circuit. The phase tracker circuit periodically updates and corrects the value of the lower resolution phase accumulator circuit. This effectively increases the resolution of the lower resolution, high speed phase accumulator circuit. By operating the high resolution circuitry at a reduced clock speed, the phase tracker circuit consumes less power than a conventional high speed DDS accumulator circuit of equal resolution.

In accordance with another form of the present invention, a chirp direct digital synthesizer is formed with low resolution phase and frequency accumulators operating in parallel with a high resolution phase and frequency tracker circuit. The phase and frequency tracker circuit is operatively coupled to the accumulators within the direct digital synthesizer. The phase and frequency tracker circuit operates at a sub-synchronous clock speed to that of the chirp direct digital synthesizer and periodically updates the low resolution phase and frequency accumulator circuits. By periodically updating the low resolution circuitry with correction values from the high resolution phase and frequency tracker circuit, the resolutions of the accumulator circuits are effectively increased to that of the tracker circuit. Further, as the tracker circuit is operating at a reduced clock speed, the tracker circuit consumes significantly less power then would an equivalent resolution circuit operating at the higher clock speed of the accumulators.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 3:
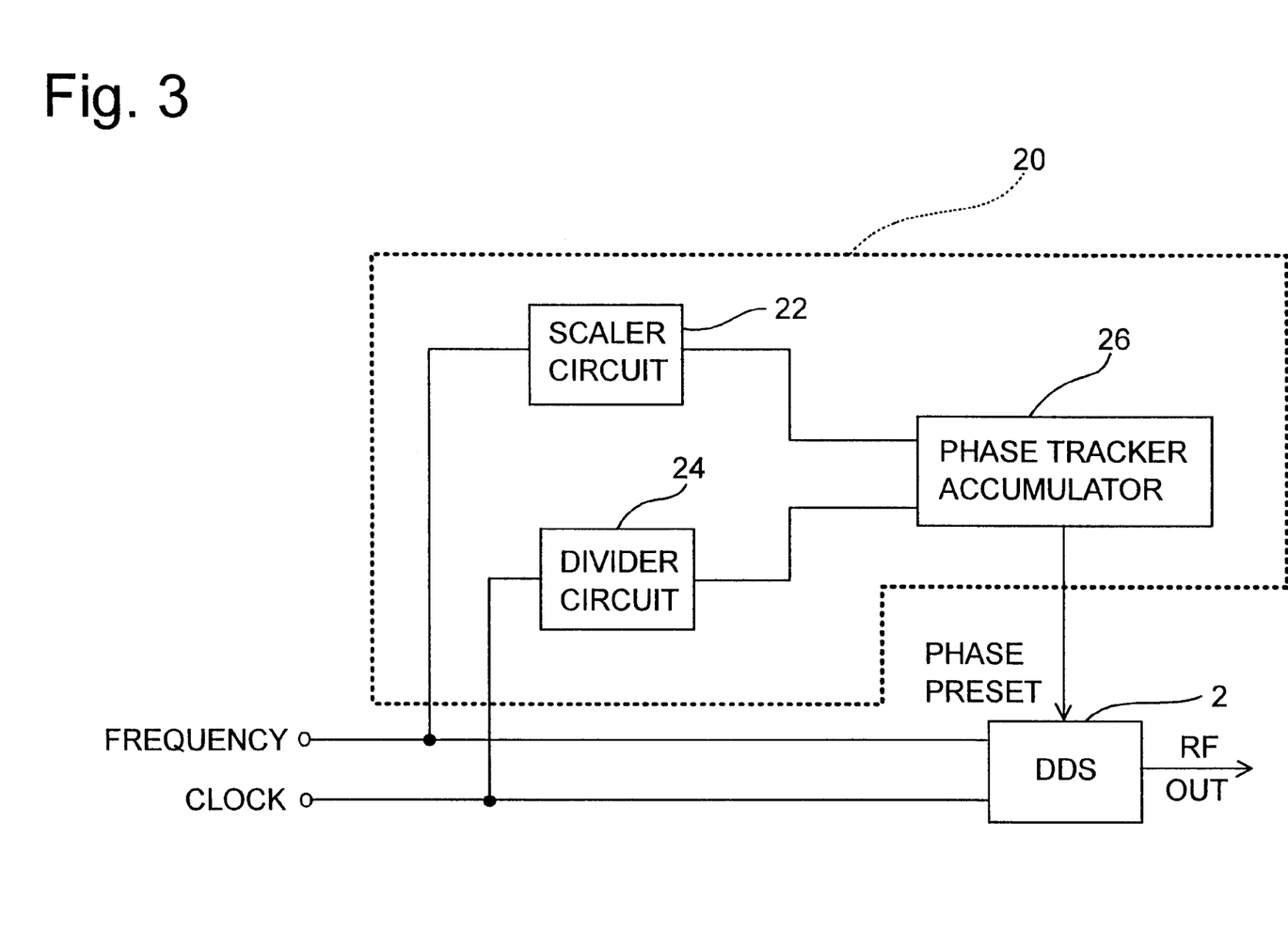
FIG. 3 is a block diagram of a phase tracker circuit operatively coupled to a direct digital synthesizer in accordance with the present invention.
Figure 4A:
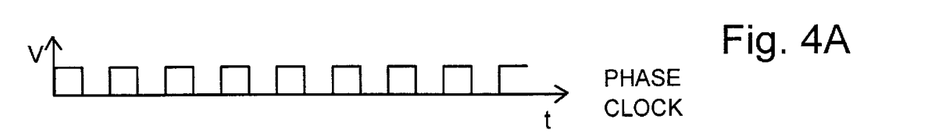
FIGS. 4A, 4B, 4C and 4D are timing diagrams of a phase tracker circuit and direct digital synthesizer formed in accordance with the present invention.
Figure 4B:
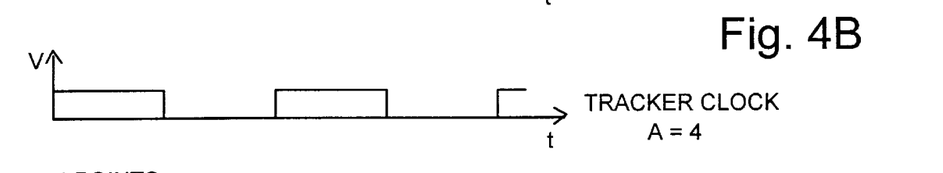
Figure 4C:
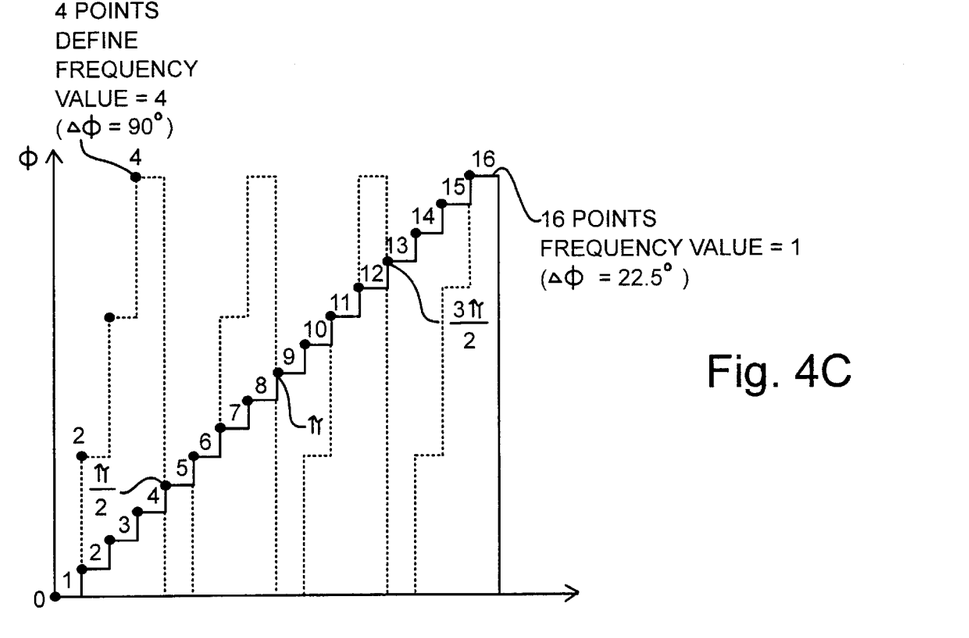
Figure 4D:
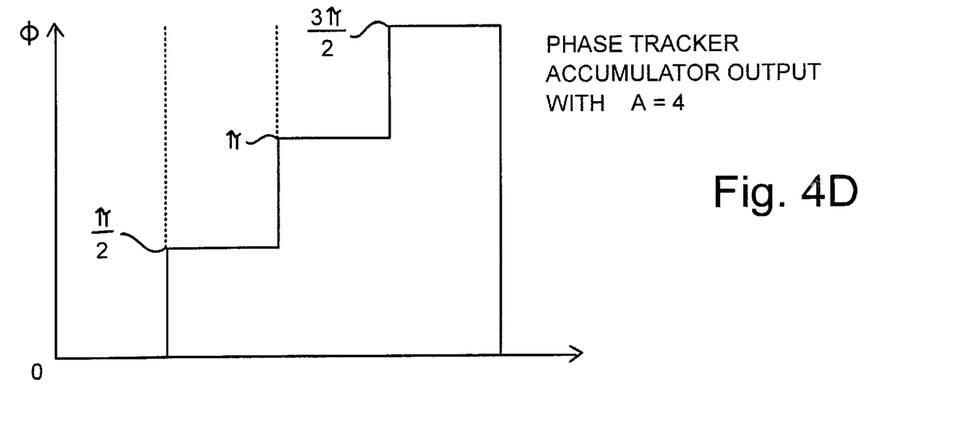

A direct digital synthesizer (DDS) employing a continuous wave (CW) phase tracker circuit, and formed in accordance with the present invention, is illustrated in block diagram form in FIG. 3. The DDS 2, which is equivalent to that shown in FIG. 1, includes a phase clock input terminal, a frequency value input terminal, a phase preset input terminal and an analog output terminal. The phase tracker circuit 20 operates in parallel with the phase accumulator circuit 4 of the direct digital synthesizer. The phase tracker circuit 20 periodically provides phase information to the phase preset input terminal of the DDS 2.

The phase tracker circuit 20 includes three primary operating elements: a scaler circuit 22, a divider circuit 24 and a phase tracker accumulator 26. The divider circuit 24 has an input terminal which is operatively coupled to the phase clock input terminal of the DDS 2 and receives the phase clock signal from an external controller. The divider circuit 24 generates a tracker clock signal which has a frequency equal to the received phase clock signal frequency divided by a predetermined constant, A. The divider circuit 24 further includes an output terminal which is operatively coupled to the phase tracker accumulator 26. The tracker clock signal is presented on the output terminal and is received by the phase accumulator 26.

The scaler circuit 22 is operatively coupled to the frequency value input terminal of the DDS 2. The scaler circuit 22 receives the DDS frequency value signal from an external controller and multiplies this value by the same predetermined constant, A, as is used by the divider circuit 24. The multiplied (scaled) frequency value is presented to the phase tracker accumulator 26. The scaled frequency value establishes a step size at which the phase tracker accumulator 26 will increment in response to the tracker clock signal. By receiving both the scaled frequency value and the divided tracker clock signal, the phase tracker accumulator 26 generates a phase value which mirrors the phase value in the DDS phase accumulator circuit after every A phase clock cycles. This relationship is illustrated in the timing diagrams shown in FIGS. 4A–4D.

Referring to FIGS. 4A–4D, a simplified example of the DDS timing is illustrated wherein 16 points are used to define the sine wave output of the DDS 2 and a value of 4 is assigned to A. Typically, several thousand points or more will actually define the sine wave output from the DDS 2. However, this simplified example serves to show that after every A (4) phase clock cycles, the phase tracker accumulator value corresponds to that of the phase accumulator.

The phase tracker circuit 20 can be used to effectively increase the resolution of a DDS 2. To perform this function, the phase tracker accumulator 26 must be selected to have a greater number of bits than the DDS phase accumulator 4 (FIG. 1). By periodically updating the DDS's phase values with the values computed by the higher resolution phase tracker circuit 20, the DDS resolution is enhanced.

For example, assume the phase tracker accumulator circuit includes a 32 bit accumulator, and the DDS phase accumulator includes a 20 bit accumulator. Because the phase tracker accumulator 26 has 32 bits, it has an inherent resolution of $2^{32}$, or 4,294,967,296, discrete points. The phase accumulator of the DDS, with only 20 bits, has a resolution of only $2^{20}$ or 1,048,576 points. By insuring that the DDS phase accumulator 4 is in phase with the high resolution phase tracker accumulator 26 after every A clock cycles, any long term error accumulating within the DDS phase accumulator 4 is eliminated. In this way, the higher resolution of the phase tracker circuit 20 is imputed onto the low resolution DDS phase accumulator 4.

If this phase updating process is performed sufficiently often, the phase accumulation value within the DDS phase accumulator 4 will not drift far from that of the high resolution phase accumulation value within the phase tracker accumulator circuit 26. To accomplish this, the value A must be sufficiently small to satisfy the relationship $$\frac{\text{LN}A}{\text{LN}2} < m - 1$$

where 1 is the number of bits in the address of sine lookup table and m is the number of bits in the DDS Accumulator. Satisfying this condition ensures that phase error due to truncation in the low resolution DDS phase accumulator does not accumulate into the bits used for the sine lookup.

Figure 5:
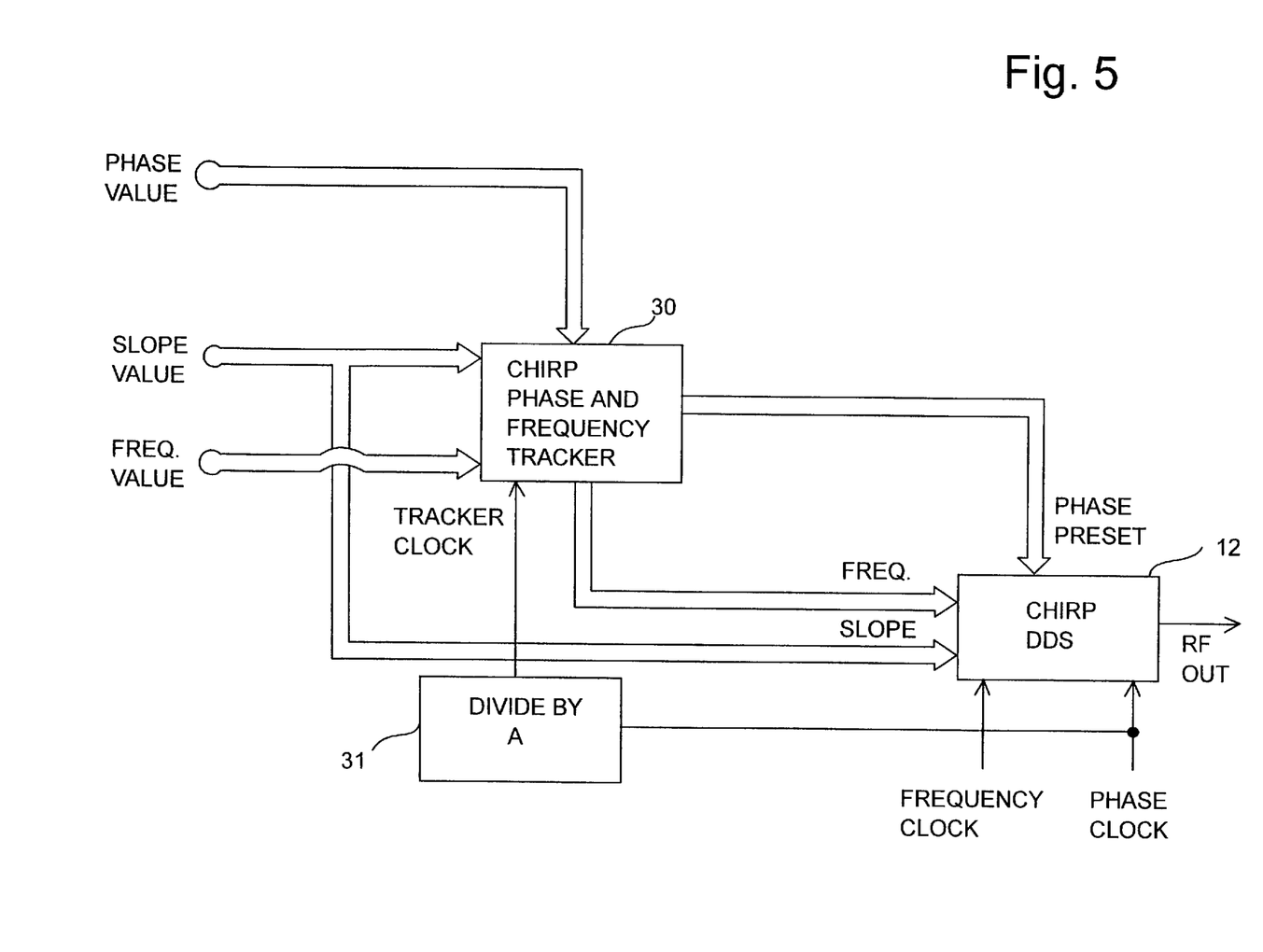
FIG. 5 is a block diagram of a chirp phase and frequency tracker operatively coupled to a chirp direct digital synthesizer in accordance with the present invention.

The principle of operating a sub-synchronous tracker circuit may be extended from a CW DDS to a chirp DDS. FIG. 5 illustrates a block diagram of a chirp direct digital synthesizer 12 operatively coupled to a chirp phase and frequency tracking circuit (chirp tracker) 30 in accordance with the present invention. The chirp tracker 30 receives a phase clock signal, a slope value signal, and a frequency value signal from an external controller. The chirp tracker 30 is responsive to these signals and generates frequency and phase correction signals for a chirp DDS 12, such as the one previously illustrated in FIG. 2.

Figure 6:
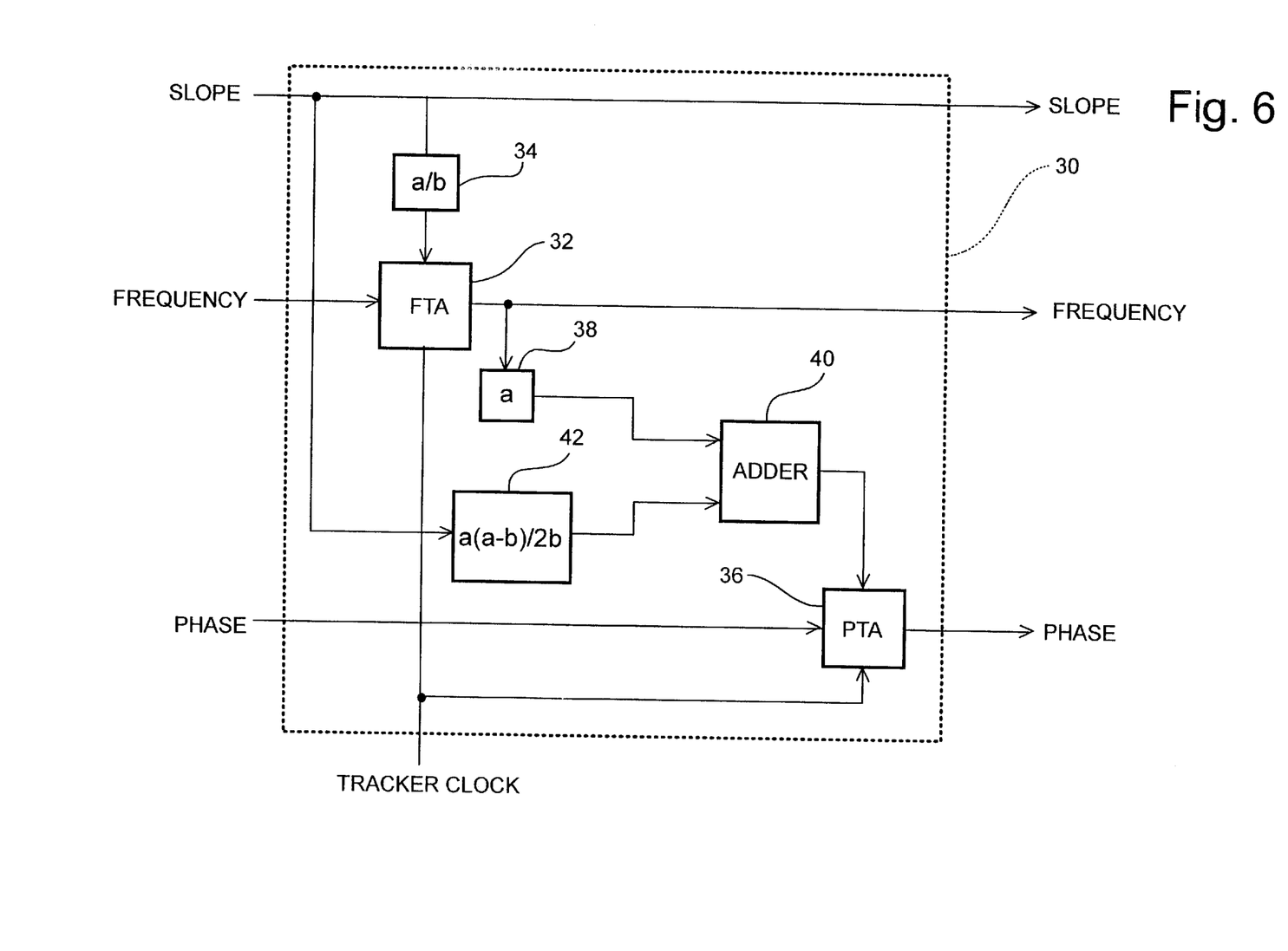
FIG. 6 is a block diagram of a phase and frequency tracker circuit for a chirp direct digital synthesizer, formed in accordance with the present invention.

The chirp tracker 30 maintains accumulator values for both the continuously variable frequency as well as the continuously variable phase of the chirp DDS output signal. A block diagram of a circuit which performs these functions is illustrated in FIG. 6.

The frequency accumulator 10 of the chirp DDS 12 contains a value which follows a simple linear progression. This value is determined by the slope value, S, and the ratio of the DDS phase clock rate divided by the DDS frequency clock rate. This ratio will be denoted as B. The progress of the DDS frequency accumulator can then be expressed as a recursive equation:

$$F_i = F_{i-1} + \frac{S}{B},$$

where i is an integer value of the phase clock, and $F_i$ is the frequency value at time i.

The chirp tracker 30, which must mirror the above stated frequency progression of the frequency accumulator 10 (FIG. 2), includes a frequency tracker accumulator (FTA) circuit 32. The FTA circuit 32 is operatively coupled to a divider circuit 31 (FIG. 5) and receives a tracker clock signal therefrom. The divider circuit 31 receives the DDS phase clock signal and generates the tracker clock signal as a synchronous sub-multiple of the DDS phase clock signal. The divider 31 reduces the phase clock signal by an integer factor of A, which is equal to the DDS phase clock frequency value divided by the tracker clock frequency value.

The FTA circuit 32 generates an accumulator output value which periodically coincides with the value in the DDS frequency accumulator 10. Since the FTA circuit 32 runs at a reduced clock speed, the phase value of this circuit must increment with proportionately larger steps per tracker clock cycle. The frequency progression of the FTA circuit 32 is stated by the following recursive equation:

$$F_i = F_{i-1} + \left(\frac{A}{B}\right)S.$$

To perform this frequency progression, the FTA circuit 32 receives an initial frequency value from an external controller. The FTA circuit 32 is also operatively coupled to a slope scaler circuit 34 which receives the slope value from the external controller. This is the same slope value which is received by the chirp DDS 12. The slope scaler circuit 34 multiplies the received slope value by the factor $$\frac{A}{B}$$

and presents this product to the FTA circuit 32. The FTA circuit 32 generates an accumulator output signal which initially represents the received frequency value, then increments this value by the scaled slope value, $$\left(\frac{A}{B}\right)S,$$

for each received tracker clock signal. The accumulator output signal of the circuit 32 is presented on a frequency output terminal of the chirp tracker circuit 30 and is received by the chirp DDS 12 on the frequency input terminal.

The phase of a sinusoidal signal may be expressed as the integral of the frequency of that signal. In a chirp DDS, the frequency changes in a linear fashion. The integral of this linear frequency change results in a quadratic phase progression within a chirp DDS. To mirror the phase of the chirp DDS, the chirp tracker 30 must also progress in a quadratic manner. Since the chirp tracker 30 operates at the tracker clock signal rate, the chirp tracker 30 must increment with step sizes which are proportionately larger than that of the DDS to compensate for the reduced operating speed of the tracker clock signal. The chirp tracker 30 includes a phase tracker accumulator (PTA) circuit 36 which performs this function in response to received slope and frequency values which have been appropriately scaled.

The quadratic phase progression of the PTA circuit 36 is the result of the sum of two terms. The first term is related to the frequency value. The second term is related to the slope value. The contribution from the frequency value may be expressed by the term, $A \cdot F_i$. The contribution from the frequency term is enabled by operatively coupling the accumulator output signal of the FTA circuit 32 to a first phase scaler circuit 38. The first phase scaler circuit 38 receives the value $F_i$ from the FTA circuit 32 and multiplies this value by the factor of A. The multiplied value is then presented on an output of the first phase scaler circuit 38 which is operatively coupled to a first input terminal of an adder circuit 40. The adder circuit 40 includes an output terminal which is operatively coupled to the PTA circuit 36.

The contribution in the phase progression of the PTA circuit 36 from the slope term is related to the phase accumulation which results from the increasing frequency of the chirp DDS. To properly mirror the resulting phase change, the PTA circuit 36 must generate a scaled slope increment value which is equal to A·S((A−B)/2·B). To understand this increment value, recall that there are $$\frac{A}{B}$$

frequency accumulator cycles within the DDS for each tracker clock cycle. During the first clock cycle of the frequency accumulator 10, the DDS is preloaded with a frequency value from an external controller. The slope value does not affect this initial value. However, the slope term does alter the frequency value over the over the next (A/B−1) frequency accumulator cycles. After (A/B−1) frequency accumulator cycles, the frequency accumulator 10 will have incremented by a value of S·(A/B−1). Since the frequency accumulator linearly increases from a start frequency of a final value of the start frequency plus S·(A/B−1) prior to resetting, the average increase in value of the frequency accumulator 10 over this progression may be stated as:

$$(A/B-1)\frac{S}{2}, \text{ or } ((A-B)/2 \cdot B) \cdot S.$$

This average value of the frequency accumulator 10 must be multiplied by a factor of A before being received by the PTA circuit 36. This multiplication increases the increment value to compensate for the reduced operating rate of the tracker clock signal.

The required contribution from the slope term is implemented by electrically coupling the received slope value signal to the PTA circuit 36 through a second phase scaler circuit 42. The second phase scaler circuit 42 receives the slope value from the external controller and multiplies this value by the factor of A·A−B/2·B. This multiplied slope value is then presented to a second input terminal of the adder circuit 40.

The adder circuit 40 combines the values on the first and second input terminals and generates an output signal representing the phase progression increment value of the PTA circuit 36. The PTA circuit 36 receives this signal and generates a phase progression counter signal which follows the recursive equation:

$$P_i = A \cdot S(A-B)/2B + AF_{i-1} + P_{i-1}$$

In this equation, i is an integer representing the number of clock cycles, $F_i$ is the frequency at time i, $P_i$ is the phase at time i, S is the slope value, A=DDS phase clock/the tracker clock and B=the DDS phase clock/DDS frequency clock.

The PTA circuit 36 further includes an output terminal on which the phase progression signal is presented. This output terminal is operatively coupled to the phase preset input terminal of the DDS 12. The DDS 12 responds to the phase progression signal by matching the phase value of the DDS output signal to the value of the phase progression signal.

For the chirp tracker 30 to provide a benefit to the DDS 12, the FTA circuit 32 and PTA circuit 36 must feature higher resolution (a higher number of accumulator bits) than each of the DDS frequency accumulator 10 and phase accumulator 4 respectively. When this condition is observed, the resolution of the DDS 12 will be enhanced by the chirp tracker 30. Therefore, for a specific required resolution, a lower resolution DDS 12 may be used in conjunction with a higher resolution chirp tracker 30 to meet the required resolution requirements with both lower power consumption and lower cost.

Figure 7:
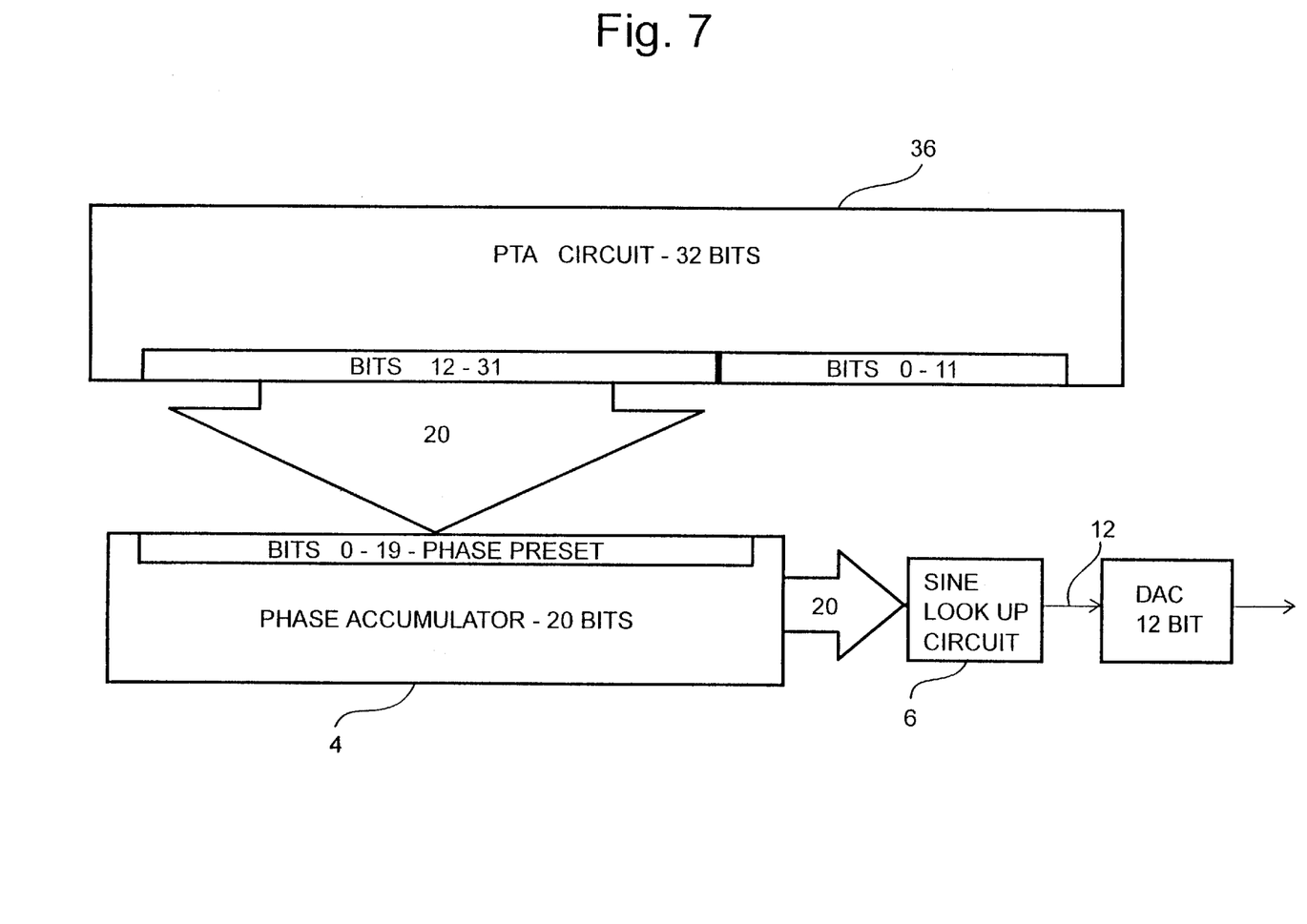
FIG. 7 is a block diagram illustrating the interconnection between the phase and frequency tracker circuit and a chirp DDS in accordance with the present invention.

FIG. 7 illustrates the interconnection between the PTA circuit 36 and the DDS phase accumulator 4 in accordance with a preferred embodiment of the present invention. The PTA circuit 36 is formed having a 32 bit accumulator. The DDS phase accumulator is formed with a 20 bit phase preset input bus. The 20 bit phase input bus is operatively coupled to the 20 most significant bits of the 32 bit accumulator. The 12 least significant bits of the accumulator are left unconnected.

For example, in a chirp DDS with a 576 MHZ phase clock, the resolution of a 20 bit DDS is equal to $576 \times 10^6 / 2^{20}$, or 549 hertz (Hz). The resolution of the 32 bit accumulator is equal to $576 \times 10^6 / 2^{32}$, or 0.134 Hz. With every tracker clock cycle, the phase value of the accumulator increments such that it corresponds to that of the DDS phase accumulator. Even though only the 20 most significant bits are connected to the DDS 12, the value presented to the DDS after every tracker clock signal corrects the output of the DDS to a resolution of 0.134 Hz. The FTA circuit 32 and frequency accumulator 10 (not shown in FIG. 7) are connected and operated in a similar fashion.

The improvement in resolution which may be obtained from the tracker circuit is substantial, yet not unbounded. The limit is set by the maximum error which is allowed to accumulate during each tracker clock cycle. Truncation error occurs due to the difference in the number of bits between the chirp tracker 30 and the DDS 12. The truncation error is expressed as $2^{-m}$, where m is the number of bits in the accumulator of the PTA and FTA circuits. The accumulated error is found by multiplying the truncation error by the phase progression terms A(A−B)/2B and A. This error must be maintained to a value less than $2^{-L}$, where L is the number of bits used by the DDS for sine lookup. Therefore, the chirp tracker circuit 30 will properly operate to enhance the resolution of a DDS 12 so long as the equation:

$$\left[\frac{A(A-B)}{2B} + A\right] \times 2^{-M} < 2^{-L} \text{ is satisfied.}$$

In applications where the DDS is to switch between multiple operating frequencies, multiple tracker circuits may be used to maintain phase coherence for each frequency. This feature is especially useful when a DDS is being used to generate modulation where phase coherence is an important consideration. The block diagram of FIG. 8 illustrates an implementation using two CW tracker circuits 20A, 20B operating with a single DDS 2 to generate frequency shift keyed modulation with phase coherence.

Figure 8:
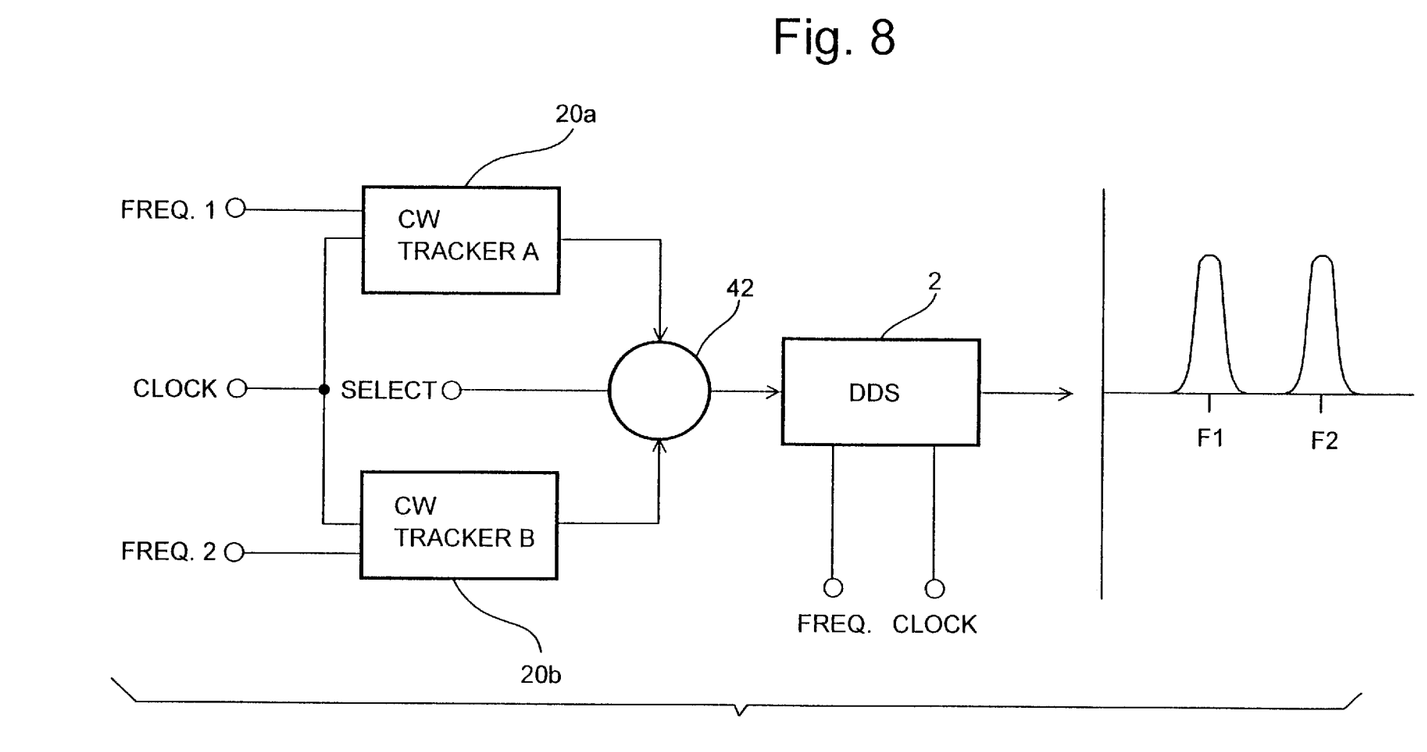
FIG. 8 is a block diagram of a modulation generator employing a DDS and two CW tracker circuits formed in accordance with the present invention.
Figure 8A:
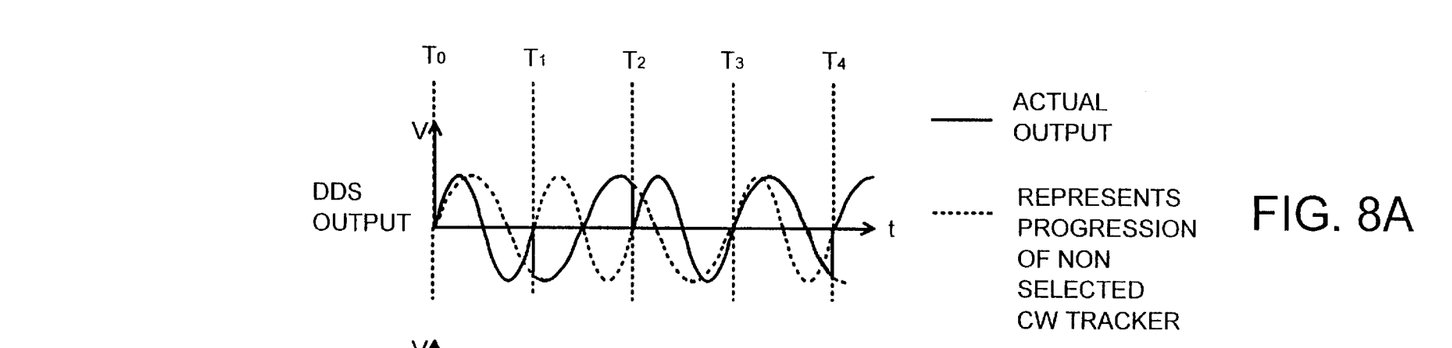
FIGS. 8A, 8B, 8C and 8D are timing diagrams of signals associated with the modulation generator of FIG. 8.
Figure 8B:
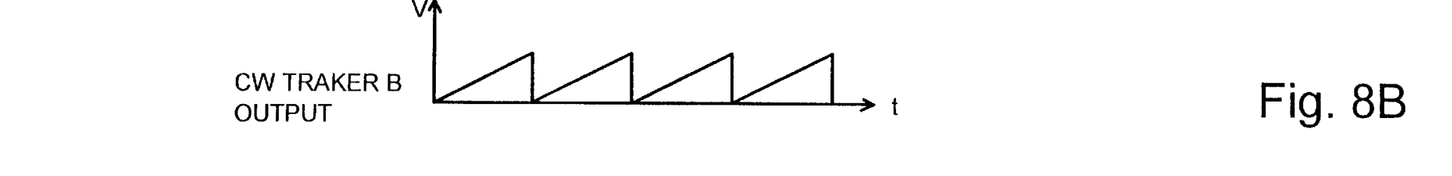
Figure 8C:
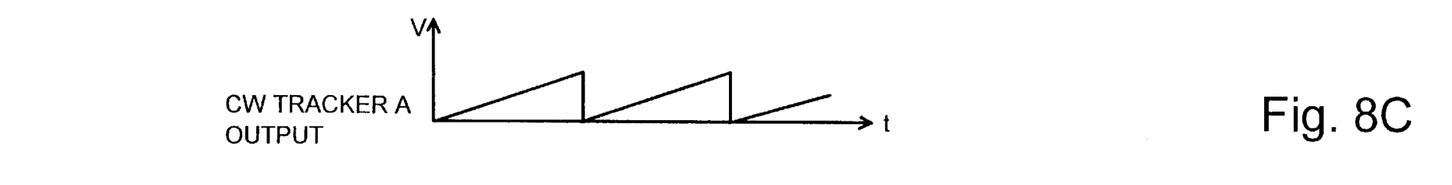
Figure 8D:
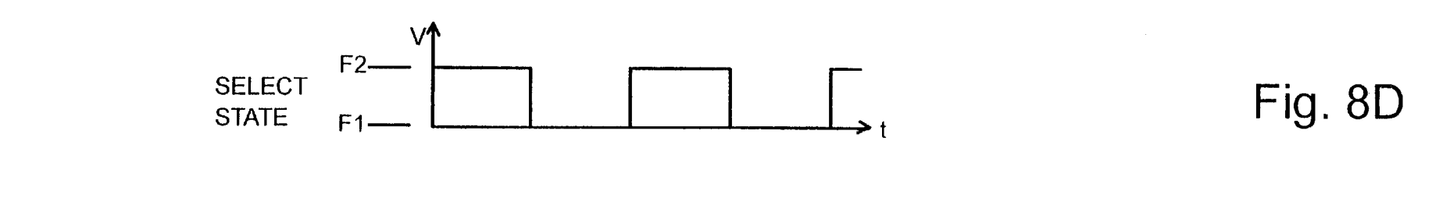

Referring to FIG. 8, the two CW trackers 20A, 20B are each operatively coupled through a multiplexer (MUX) 42 which will selectively route the output of one of the CW trackers to the DDS 2. The MUX 42 is controlled by a digital signal applied to a select input terminal.

CW tracker 20A is loaded with a frequency value corresponding to a first frequency, F1, selected to be generated by the DDS. CW tracker 20B is loaded with a second frequency value, F2, corresponding to a second modulation frequency to be generated by the DDS. In response to a received clock signal, both CW tracker A and B will continuously accumulate the phase values for the respective frequencies. The DDS 2 is then alternately loaded with the values for frequencies 1 and 2 to generate the modulation signal. Coincidental with the switching of the DDS frequency value, the digital signal applied to the select input terminal changes states to select the appropriate CW tracker for the selected frequency.

The timing diagrams of FIGS. 9A–9D illustrates the frequency switching process. From these timing diagrams, it can be readily observed that as long as the DDS 2 switches frequencies synchronously with a tracker clock cycle, the phase of the output signal will be set as though the DDS 2 was continuously operating at the selected frequency. This effect is equivalent to having a separate DDS running continuously at each of the desired frequencies and alternatively selecting between the two. In a similar fashion, chirp trackers can be used in place of CW trackers for coherent operation when multiplexing among multiple chirp waveforms.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A direct digital synthesizer for generating continuous wave output signals in response to phase clock and frequency value signals received from an external controller, the direct digital synthesizer comprising:

a clock divider circuit, the clock divider circuit being operatively coupled to the external controller to receive the phase clock signal therefrom, the clock divider circuit generating a tracker clock signal which is synchronous to the received phase clock signal and has a frequency which is equal to the phase clock signal frequency divided by a predetermined integer divider value;

a DDS phase accumulator circuit, the DDS phase accumulator circuit including a frequency input terminal, a clock input terminal, a phase preset input terminal and an accumulator output terminal, the frequency input terminal being operatively coupled to the external controller to receive the frequency value signal therefrom, the clock input terminal being operatively coupled to the external controller to receive the phase clock signal therefrom, the DDS phase accumulator circuit generating an address signal which is presented on the accumulator output terminal in response to the received phase clock and frequency value signals;

a phase tracker circuit, the phase tracker circuit including a tracker clock input terminal, a tracker frequency input terminal and a tracker output terminal, the tracker clock input terminal being operatively coupled to the clock divider circuit and receiving the tracker clock signal therefrom, the tracker frequency input terminal being operatively coupled to the external controller and receiving the frequency value signal therefrom, the phase tracker circuit being responsive to the received frequency value and tracker clock signal and generating a phase tracking signal, the phase tracking signal corresponding to an expected phase value in the phase accumulator circuit, the tracker output terminal being operatively coupled to the phase preset input terminal of the DDS phase accumulator circuit such that the DDS phase accumulator circuit receives the phase tracking signal, whereby the address signal from the DDS phase accumulator circuit is corrected;

a sine lookup circuit, the sine lookup circuit including an address input terminal and an output bus, the address input terminal being operatively coupled to the accumulator output terminal of the DDS phase accumulator circuit and presenting a sine value signal on the output bus in response to the address signal, the sine value signal representing a point on a sine wave which corresponds to the address signal; and a digital to analog converter (DAC), the DAC including an input bus and an analog output terminal, the input bus being operatively coupled to the output bus of the sine lookup circuit and receiving the sine value signal therefrom, the DAC generating an analog voltage signal corresponding to the received sine value which is presented on the analog output terminal, whereby an analog sine wave signal is generated.

2. A direct digital synthesizer, as defined by claim 1, wherein the phase tracker circuit further comprises:

a frequency value scaler circuit, the frequency value scaler circuit being operatively coupled to the tracker frequency input terminal to receive the frequency value signal, the frequency value scaler circuit generating a scaled frequency value signal which is equal to the received frequency value multiplied by the integer divider value of the clock divider circuit; and a tracker phase accumulator circuit, the tracker phase accumulator circuit further including a scaled frequency value input terminal, a clock input terminal, and a tracker phase accumulator output terminal, the clock input terminal being operatively coupled to the tracker clock input terminal and receiving the tracker clock signal therefrom, the scaled frequency value input terminal being operatively coupled to the frequency scaler circuit to receive the scaled frequency value therefrom, the tracker phase accumulator circuit generating the phase tracking signal which is presented on the tracker output terminal.

3. A direct digital synthesizer, as defined by claim 2, wherein:

the tracker phase accumulator circuit further includes a first register, the first register having a storage length of M binary weighted storage bits, the first register storing the phase tracking signal therein;

the DDS phase accumulator circuit further including a second register, the second register having a storage length of L binary weighted storage bits, the second register storing the address signal therein; and wherein M>L, and the L most significant bits of the first register are operatively coupled to the second register and the phase tracking signal is provided every tracker clock cycle.

4. A chirp direct digital synthesizer for generating continuous wave or frequency chirp output signals in response to received frequency value, frequency clock, phase value, phase clock and slope signals from an external controller, the chirp direct digital synthesizer comprising:

a DDS frequency accumulator circuit, the DDS frequency accumulator circuit having a first frequency value input terminal, a slope value input terminal, a frequency clock input terminal and a frequency value output terminal, the first frequency value input terminal, the slope input terminal and the frequency clock input terminal each being operatively coupled to the external controller and receiving the frequency value, slope value and frequency clock signals respectively, the DDS frequency accumulator circuit generating a chirp frequency counter signal which periodically cycles from the received frequency value to a predetermined end value in incremental steps defined by the received slope value, the chirp frequency counter signal is presented on the frequency value output terminal;

a DDS phase accumulator circuit, the DDS phase accumulator circuit having a second frequency input terminal, a phase clock input terminal, a phase preset input terminal and an accumulator output terminal, the frequency input terminal being operatively coupled to the frequency value output terminal and receiving the chirp frequency counter signal therefrom, the phase clock input terminal being operatively coupled to the external controller to receive the phase clock signal therefrom, the DDS phase accumulator circuit generating an address signal which is presented on the accumulator output terminal in response to the received phase clock signal, chirp frequency counter signal and a signal presented on the phase present input terminal;

a clock divider circuit, the clock divider circuit being operatively coupled to the external controller to receive the phase clock signal therefrom, the clock divider circuit generating a tracker clock signal which is synchronous to the received phase clock signal and has a frequency which is equal to the phase clock signal frequency divided by a predetermined integer divider value;

a phase and frequency tracker circuit, the phase and frequency tracker circuit including a tracker frequency input terminal, a tracker slope input terminal, a tracker phase input terminal, a tracker clock input terminal, a tracker phase output terminal, and a tracker frequency output terminal, the tracker frequency input terminal, the tracker slope input terminal and the tracker phase input terminal each being operatively coupled to the external controller and receiving the frequency value, slope value and phase value signals respectively therefrom, the tracker clock input terminal being operatively coupled to the clock divider circuit and receiving the tracker clock signal therefrom, the phase and frequency tracker circuit generating a phase tracking signal which mirrors the address value within the DDS phase accumulator and periodically provides correction thereto, the phase and frequency tracker circuit also generating a frequency tracking signal which mirrors the chirp frequency counter signal value within the DDS frequency accumulator circuit and periodically provides correction thereto;

a sine lookup circuit, the sine lookup circuit including an address input terminal and an output bus, the address input terminal being operatively coupled to the accumulator output terminal of the DDS phase accumulator circuit and presenting a sine value signal on the output bus in response to the address signal, the sine value signal representing a point on a sine wave which corresponds to the address signal; and a digital to analog converter (DAC), the DAC including an input bus and an analog output terminal, the input bus being operatively coupled to the output bus of the sine lookup circuit and receiving the sine value signal therefrom, the DAC generating an analog voltage signal corresponding to the received sine value signal which is presented on the analog output terminal, whereby an analog sine wave signal is generated.

5. A chirp direct digital synthesizer, as defined by claim 4, wherein the phase and frequency tracker circuit further comprises:

a first slope scaler circuit, the first slope scaler circuit being operatively coupled to the external controller and receiving the slope value signal therefrom, the first slope scaler circuit multiplying the received slope value by a first predetermined value to generate a first scaled slope value signal;

a second slope scaler circuit, the second slope scaler circuit being operatively coupled to the external controller and receiving the slope value signal therefrom, the second slope scaler circuit multiplying the received slope value signal by a second predetermined value to generate a second scaled slope value signal;

a tracker frequency accumulator circuit, the tracker frequency accumulator circuit being operatively coupled to the external controller and receiving the frequency value signal therefrom, the tracker frequency accumulator circuit also being operatively coupled to the clock divider circuit to receive the tracker clock signal therefrom, the tracker frequency accumulator circuit further being operatively coupled to the first slope scaler circuit and receiving the first scaled slope signal therefrom, the tracker frequency accumulator circuit generating the frequency tracking signal in response to the received frequency value, first scaled slope signal and tracker clock signal.

a frequency scaler circuit, the frequency scaler circuit receiving the frequency output signal and multiplying this signal by the integer divider value of the clock divider circuit to generate a scaled frequency value output signal;

an adder circuit, the adder circuit including first and second adder input terminals and an adder output terminal, the first adder input terminal being operatively coupled to the frequency scaler circuit and receiving the scaled frequency value signal therefrom, the second adder input terminal being operatively coupled to the second slope scaler circuit and receiving the second scaled slope value signal therefrom, the adder circuit generating an adder output signal presented on the adder output terminal which is equal to the sum of the scaled frequency value and second scaled slope value signals; and a tracker phase accumulator circuit, the tracker phase accumulator circuit being operatively coupled to the external controller and receiving the phase value signal therefrom, the tracker phase accumulator also being coupled to the clock divider circuit and receiving the tracker clock signal therefrom, the tracker phase accumulator also being coupled to the adder output terminal and receiving the adder output signal therefrom, the tracker phase accumulator generating the phase tracking signal in response to the received signals as follows:

the received phase value defines a starting value of the phase tracking signal;

the received adder output signal defines a step size; and the phase tracking signal value incrementing by the magnitude of the step size for every received tracker clock signal.

6. A chirp direct digital synthesizer, as defined by claim 5, wherein:

the tracker frequency accumulator circuit further includes a first register, the first register being at least partially defined by M binary weighted storage bit locations storing the frequency tracking signal;

the tracker phase accumulator circuit further includes a second register, the second register being at least partially defined by M binary weighted storage bit locations storing the phase tracking signal;

the DDS frequency accumulator circuit further includes a third register, the third register being at least partially defined by L binary weighted storage bit locations storing the frequency value;

the DDS phase accumulator circuit further includes a fourth register, the fourth register being at least partially defined by L binary weighted storage bit locations storing the address value; and wherein M>L, and the L most significant bits of the first register and second register are operatively coupled to the third register and fourth register respectively, and the phase and frequency tracking signals are provided after every tracker clock cycle.

7. A phase tracker circuit for use with a direct digital synthesizer (DDS) having a phase preset input terminal, the phase tracker circuit receiving phase clock and frequency value signals from an external controller, the phase tracker circuit comprising:

a clock divider circuit, the clock divider circuit receiving the phase clock signal and generating a tracker clock signal which is equal in frequency to the original clock signal divided by a predetermined integer divider value;

a frequency value scaler circuit, the frequency value scaler circuit being operatively coupled to the external controller to receive the frequency value signal therefrom, the frequency value scaler circuit generating a scaled frequency value signal which is equal to the received frequency value multiplied by the integer divider value of the clock divider circuit; and a tracker phase accumulator circuit, the tracker phase accumulator circuit further comprising a tracker frequency value input terminal, a tracker clock input terminal, and a tracker phase accumulator output terminal, the tracker clock input terminal being operatively coupled to the clock divider circuit and receiving the tracker clock signal therefrom, the tracker frequency value input terminal being operatively coupled to the frequency scaler circuit and receiving the scaled frequency value therefrom, the tracker phase accumulator circuit generating the phase tracking signal which is presented on the tracker phase accumulator output terminal, the tracker phase accumulator output terminal being suitable for electrical interface to the phase preset input terminal of a direct digital synthesizer to provide a correction signal thereto.

8. A phase tracker circuit, as defined by claim 7, wherein:

the tracker phase accumulator circuit further includes a register, the register having a storage length of M binary weighted storage bits, the register storing the phase tracking signal therein, the L most significant bits of the register, where L is an integer less than M, being operatively coupled to the DDS, whereby the periodic correction from the phase tracking signal is provided after every tracker clock cycle.

9. A phase and frequency tracker for a chirp direct digital synthesizer (DDS), the phase and frequency tracker receiving frequency value, slope value, phase value and tracker clock signals from an external controller, the phase and frequency tracker circuit further comprising:

a first slope scaler circuit, the first slope scaler circuit being operatively coupled to the external controller and receiving the slope value signal therefrom, the first slope scaler circuit multiplying the received slope value signal by a first predetermined value to generate a first scaled slope value signal;

a second slope scaler circuit, the second slope scaler circuit being operatively coupled to the external controller and receiving the slope value signal therefrom, the second slope scaler circuit multiplying the received slope value signal by a second predetermined value to generate a second scaled slope value signal;

a tracker frequency accumulator circuit, the tracker frequency accumulator circuit being operatively coupled to the external controller and receiving the frequency value signal therefrom, the tracker frequency accumulator circuit also being operatively coupled to the external controller to receive the tracker clock signal therefrom, the tracker frequency accumulator circuit further being operatively coupled to the first slope scaler circuit and receiving the first scaled slope signal therefrom, the tracker frequency accumulator circuit generating a frequency output value signal in response to the received frequency value, first scaled slope signal and tracker clock signal, the frequency output signal being presented on the tracker frequency output terminal;

a frequency scaler circuit, the frequency scaler circuit receiving the frequency output signal and multiplying this signal by an integer value which is equal to the frequency value of the direct digital synthesizer phase clock signal divided by the frequency value of the tracker clock signal, the frequency scaler circuit generating a scaled frequency value output signal;

an adder circuit, the adder circuit including first and second adder input terminals and an adder output terminal, the first adder input terminal being operatively coupled to the frequency scaler circuit and receiving the scaled frequency value signal therefrom, the second adder input terminal being operatively coupled to the second slope scaler circuit and receiving the second scaled slope value signal therefrom, the adder circuit generating an adder output signal presented on the adder output terminal which is equal to the sum of the scaled frequency value and second scaled slope value signal; and a tracker phase accumulator circuit, the tracker phase accumulator circuit being operatively coupled to the external controller and receiving the phase value signal therefrom, the tracker phase accumulator also being coupled to the external controller and receiving the tracker clock signal therefrom, the tracker phase accumulator also being coupled to the adder output terminal and receiving the adder output signal therefrom, the tracker phase accumulator generating the phase tracking signal in response to the received signals as follows:

the received phase value signal defining a starting value of the phase tracking signal;

the received adder output signal defining a step size; and the phase tracking signal value incrementing by the magnitude of the step size for every received tracker clock signal.

10. A phase and frequency tracker, as defined by claim 9, wherein:

the tracker frequency accumulator circuit further includes a first register, the first register being at least partially defined by M binary weighted storage bit locations storing the frequency output value, the L most significant bits of the first register, where L is an integer less than M, being presented to the DDS;

the tracker phase accumulator circuit further includes a second register, the second register being at least partially defined by M binary weighted storage bit locations storing the phase tracking value signal, the L most significant bits of the second register, where L is an integer less than M, being presented to the DDS; and wherein the correction from the phase and frequency tracker is provided after every tracker clock cycle.

* * * * *